W. W. BLAIR.
Rotary Cultivator.

No. 55,607. Patented June 19, 1866.

Witnesses:
John P. Jacobs
Charles Alexander

Inventor:
Wm. W. Blair
Alexander & Mason
Attorneys

UNITED STATES PATENT OFFICE.

W. W. BLAIR, OF LEBANON, TENNESSEE.

IMPROVEMENT IN COTTON-CULTIVATORS.

Specification forming part of Letters Patent No. 55,607, dated June 19, 1866.

*To all whom it may concern:*

Be it known that I, WILLIAM W. BLAIR, of Lebanon, in the county of Wilson and State of Tennessee, have invented certain new and useful Improvements in Cotton-Cultivators; and I do hereby declare that the following is a full, clear, and exact description of the same, reference being had to the accompanying drawings and to the letters of reference marked thereon.

In the annexed drawings, making part of this specification, A represents the frame of the machine, which is supported upon an axle, B, which said axle is provided with the wheels C C, which support it. The frame A is made in a substantial manner and rectangular in form.

E represents a gear-wheel, which is secured upon the shaft or axle B, being provided with cog-wheels or teeth upon one face.

I represents a shaft, which is supported by proper bearings in the frame A, and which lies longitudinally of said frame and at right angles to the shaft B. This shaft I is provided near one end with a gear-wheel, F, which has its teeth to mesh into those of the wheel E.

Upon the shaft I is a cylinder, H', which is provided with harrow-teeth, and thus forms a revolving harrow. The harrow-teeth have adjustable points, which are regulated by means of set-screws, whereby said teeth are made longer or shorter to suit the nature of the ground or the depth it is required to be harrowed or loosened.

Figure 1:
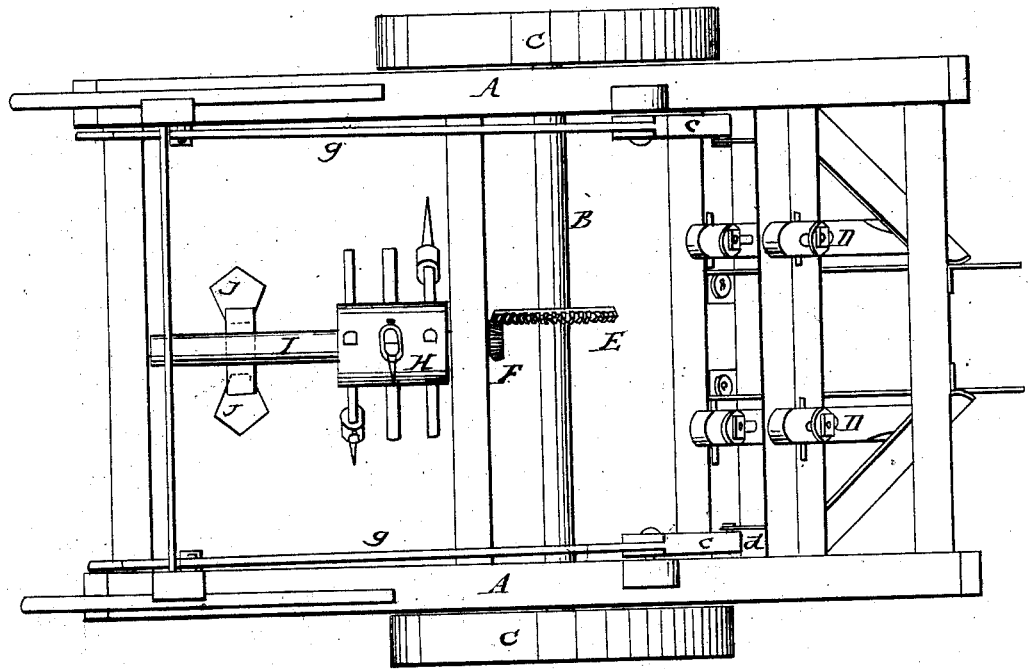
Figure 2:
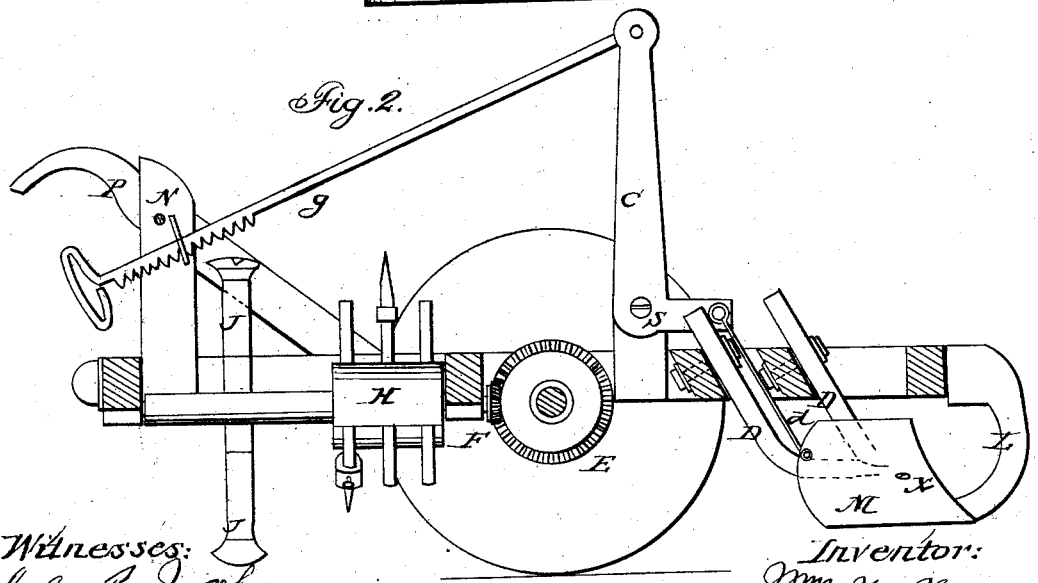

The shaft I has an opening cut through it, and into this opening two arms pass from opposite sides, which are provided with cutters or choppers J, with their points made in the shape represented in Fig. 1. These choppers revolve when the machine is put in motion, and are intended for thinning out the cotton in the drills.

The rods d are secured to the outer ends of of the scrapers M at one end, and at their other ends they are secured to the levers c c. These levers c c are pivoted to uprights which are erected upon the frame A, and are operated by means of rack-bars g g, which connect with them at the end opposite the one to which the rods d d are connected. The rack-bars g g pass through loops which are secured to standards erected upon frame A near its rear, and the teeth of said bars catch in the lower sides of said loops for stationing the bars at any desired position.

It will readily be seen that, by means of the bars g g, the levers c c, and the rods d d, the scrapers M M have their outer ends raised or lowered, thus adjusting them to the nature of the ground.

D D represent the scraper-feet, which are bars, secured by means of set-screws to cross-pieces in the frame A. These cross-pieces are provided with slots, through which the set-screws pass. The bars D D are also slotted, as seen, Fig. 1, and the set-screws also pass through the slots in said bars D, for the purpose of adjusting them to or from the ground.

The slots in the cross-pieces enable the bars D to be brought closer together. The bars D are formed as represented, and their lower ends are intended to rest against the backs of the scraper M M, thus forming a support for them.

L L represent two colters or cutters, which are curved, as shown, and which bars are secured at their forward ends to the forward end of the frame, their rear ends being secured to one of the cross-pieces to which one of the bars of scraper-feet D is secured.

When this machine is in use the colters or cutters L pass on opposite sides of the row or drill of cotton, the wheels C C running in the furrows or spaces between the drills. The scrapers scrape the spaces between the drills, the revolving harrow-teeth loosen up the earth between the plants in the drill, and the revolving cutters or choppers J J thin out the plants to the required distance apart.

P represents the handles of the machine.

Having thus fully described my invention, what I claim as new, and desire to secure by Letters Patent, is—

1. The arrangement of the adjustable revolving harrow H with the revolving and adjustable chopping-knives J J upon the shaft I, substantially as and for the purpose herein specified.

2. The scrapers M M, pivoted near their inner ends, as represented, and adjusted by means of the rods d d, levers c c, and rack-bars g g, substantially as and for the purpose herein fully set forth.

3. The arrangement of the adjustable scraper-feet D D with the scrapers M M and the cutters or colters L L, substantially as and for the purpose described.

W. W. BLAIR.

Witnesses:
 C. M. ALEXANDER,
 J. M. MASON.